Jan. 14, 1941.   G. A. WOOD   2,228,548
MULTIENGINED POWER DEVICE
Filed Aug. 29, 1938   2 Sheets-Sheet 1

Inventor
Garfield A. Wood

By Howard L. Fischer
Attorney

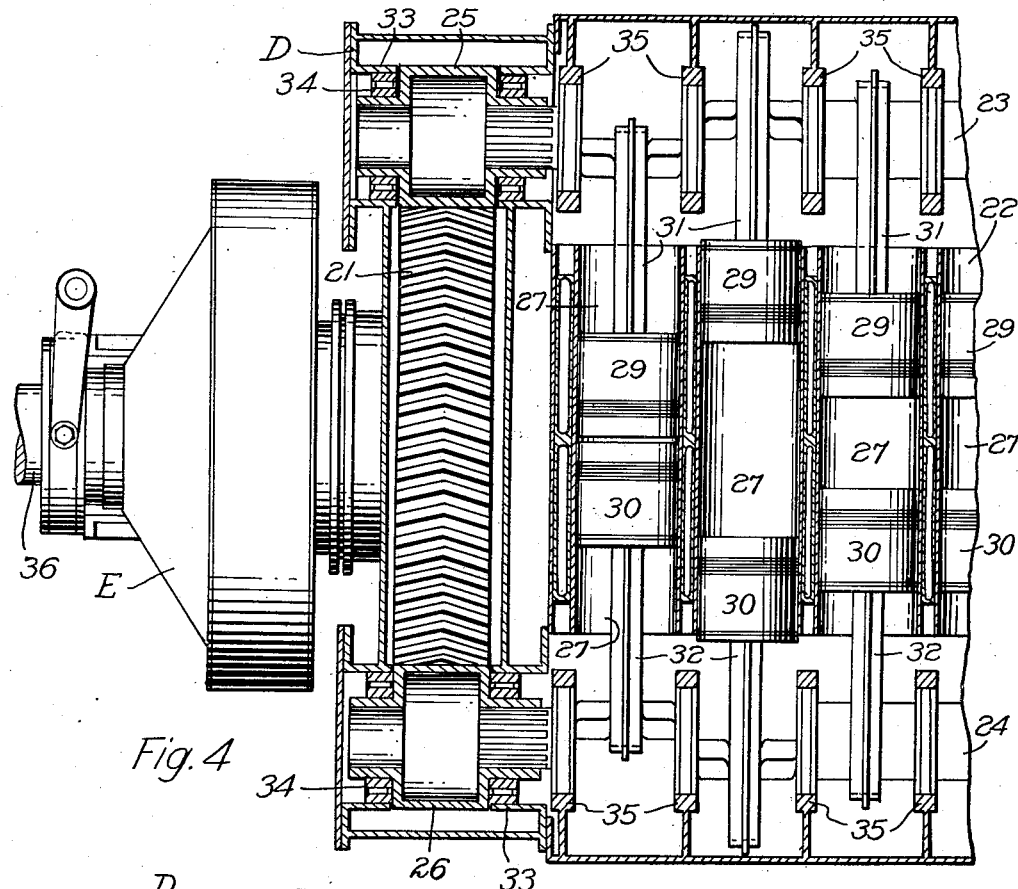
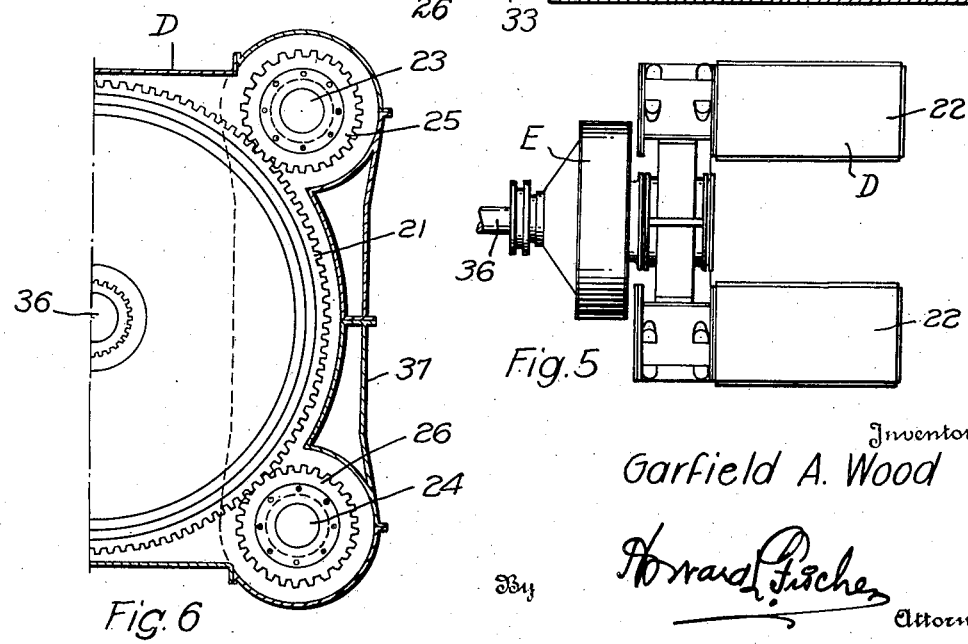

Patented Jan. 14, 1941

2,228,548

UNITED STATES PATENT OFFICE 2,228,548

MULTIENGINED POWER DEVICE

Garfield A. Wood, Algonac, Mich.

Application August 29, 1938, Serial No. 227,274

6 Claims. (Cl. 123—51)

My invention relates to an improvement in a multiengined power device wherein it is desired to provide a means of connecting a series of engines to operate a single driven device.

In the past, engines of the Diesel type have been utilized for producing power for various purposes. It has been found, however, that such engines are often difficult to control to provide a device which will be durable and which will stand up under continuous operation. Engines of this type used for marine drives, for example, must be sufficiently sturdy to withstand constant use as the disabling of an engine of this type during the movement of a vessel is likely to create a condition under which the boat cannot be controlled. Thus the failure of engines of this type in the past, has sometimes meant the crippling of a ship or perhaps the entire loss of the same.

In the use of Diesel engines for power plants of various sorts, it is also extremely necessary that nothing impair the proper operation of the plant which might result in the failure of dynamo or the like to produce needed electricity. It has therefore been previously necessary to provide alternate power plants which may be started and which may produce the necessary power in case of failure of the power plant ordinarily used.

It is the purpose of the present invention to provide a power device embodying a series of relatively light-weight and high-speed engines connected to a single shaft. In case of the failure of any one engine, the remaining engines will carry the load until the disabled engine may be repaired. It will be seen that with such a construction a certain amount of power is insured at all times unless all of the various motors cease operation at the same time which is decidedly unlikely.

It is a purpose of the present invention to provide a series of engines having the crank shafts thereof connected to a single gear which enables the various motors to be synchronized and to remain in synchronization at all times. By this means it is possible for me to embody opposed type engines having parallel crank shafts and cylinders extending between the crank shafts. A pair of pistons is provided in each cylinder, one piston of each pair being connected to one crank shaft, while the other piston thereof is connected to the other crank shaft. The crank shafts are geared directly to the synchronizing gear connected to the power drive shaft.

It will be seen that by this means, the two crank shafts of the motor are synchronized and will remain permanently in synchronization until the engine is disconnected from the drive gear. Compression is created by the action of the opposed pistons approaching one another so that higher compression may be obtained in this simple manner.

It is a purpose of my invention to provide a power device comprising a shaft, a gear or similar means mounted upon the shaft, and to connect to this single gear the drive shafts of a plurality of engines. Thus in a minimum of space a large amount of power may be developed. A considerable number of engines, each capable of producing a large amount of power can be arranged about a single gear, thereby producing an exceedingly high-powered power device with the utilization of a small amount of floor space. By connecting each separate engine to a single gear or the like, it is possible for all of the engines to remain in perfect synchronization during the operation of the same.

These and other objects and novel features of my invention will be more clearly and fully set forth in the following specification and claims.

In the drawings forming a part of my specification:

Figure 4 is a cross-sectional view through a slightly different type of engine, showing the arrangement of pistons and cylinders therein.

Figure 5 is a plan view of the engine shown in Figure 4, showing the opposed banks of cylinders arranged about a single drive gear.

Figure 6 is a cross-sectional view through the drive gear illustrating the manner in which the crank shafts are connected thereto.

Figure 1:
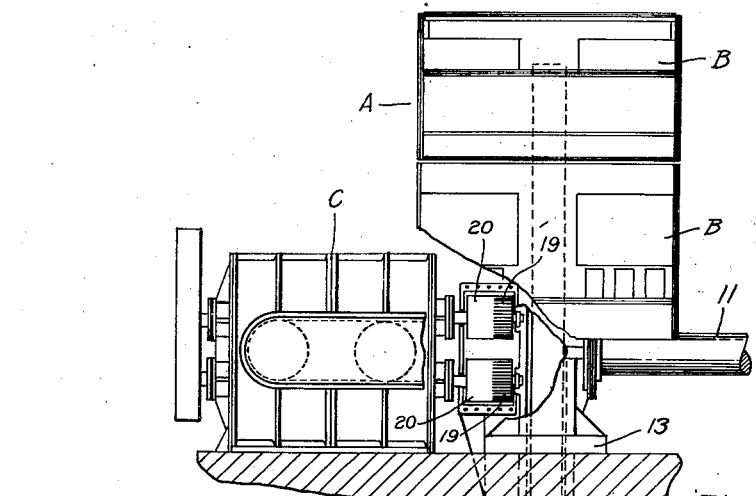
Figure 1 is a side elevation view, partly in section, of a power unit employing a series of engines arranged about a single drive gear.
Figure 2:
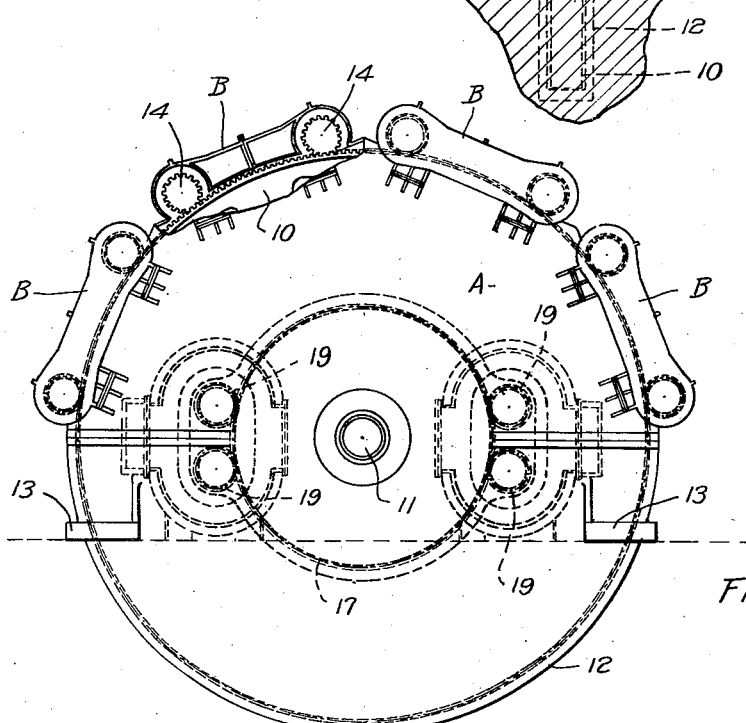
Figure 2 is a front elevation view, partly in section, of the power device illustrated in Figure 1.
Figure 3:
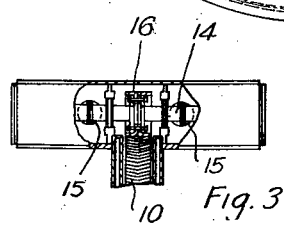
Figure 3 is a diagrammatic view, partly in section, showing the manner in which the crank shaft of one of the engines is connected to the drive gear.

The power device A illustrated in Figures 1 and 2 of the drawings is provided with a series of engines B arranged about a single drive gear 10 mounted upon a drive shaft 11. The gear 10 is designed to drive the shaft 11 and the engines B are designed to cause rotation of the gear 10. A casing 12 about the gear 10 is provided with a standard portion 13 which is of sufficient strength to support the engines B peripherally spaced about the gear 10. The engines B are preferably of the opposed cylinder type, having a pair of crank shafts 14 and having cylinders 15 extending between the pair of crank shafts 14. Pistons are provided in the cylinder, a pair of pistons being mounted in each cylinder in the manner which will be later more fully described in connection with a slightly different type of construction. The crank shafts 14 are rotated by the pistons within the cylinders 15 and a pinion 16 on each crank shaft 14 engages the gear 10. As indicated in Figure 3 of the drawings, the engines shown in Figures 1 and 2 are provided with crank shafts 14 which are centrally divided so that the gear 16 may be positioned intermediate the ends of the crank shaft. The cylinders 15 are arranged on opposite sides of the gear 16 and the power is thus taken off from the crank shaft at the center thereof.

In an engine of this type, which I believe to be commonly known as a Junkers type engine, it is, of course, necessary that the two crank shafts 14 be maintained in proper synchronization. It will also be seen that once the gears 16 have been connected to the gear 10 while the pistons are in the proper position within their cylinders, the crank shafts 14 will remain in proper synchronization due to their constant contact with the gear 10. A gear 17 is mounted upon the shaft 11 adjacent the gear 10 and this gear 17 is designed to rotate pinions 19 to operate blowers C diagrammatically illustrated in Figures 1 and 2 of the drawings. The pinions 19 as shown in Figure 1 of the drawings, are connected with an over-drive unit 20 which prevent the blowers from operating in a reverse direction. Thus when the direction of rotation of the gear 17 is changed, the blowers C will not operate in a reverse direction.

In Figures 4, 5, and 6 of the drawings, I disclose a slightly different type of power unit from that illustrated in Figures 1, 2, and 3. Figure 4 of the drawings, however, illustrates a section through the cylinders of an engine which is similar to that illustrated in Figure 3 of the drawings. In other words, the cylinders 15 disclosed in Figure 3, are of the type illustrated in Figure 4.

The power units D illustrated in Figures 4, 5 and 6, are formed substantially as illustrated. These power units D include a gear 21 and a bank of cylinders 22 arranged on either side of this gear 21. Each bank of cylinders 22 is formed as illustrated in Figure 4 of the drawings and are provided with a pair of crank shafts 23 and 24 which are designed to rotate pinions 25 and 26, respectively, which are in constant engagement with the gear 21. The crank shafts 23 and 24 are thus synchronized by the gear 21.

The banks of cylinders 22 include a series of open-ended cylinders 27 in each of which are positioned two pistons 29 and 30. The pistons 29 are connected by connecting rods 31 to offset bearing portions on the crank shaft 23, whereas, the pistons 30 are connected by similar connecting rods 32 to offset portions on the crank shaft 24. The offsets of the respective connecting rods 23 and 24 are similarly arranged so that in the rotation of these crank shafts the pistons 29 and 30 will reach the ends of their strokes simultaneously. Air is forced in any desired manner not shown in the drawings as by the blowers C into the cylinders between the pistons 29 and 30 and in the rotation of the crank shafts 23 and 24, these pistons 29 and 30 are moved inwardly simultaneously to compress the air therebetween, heating the air. While the pistons are close together, fuel is injected therebetween; the heated air causes the fuel to ignite, forcing the pistons apart. Simultaneously the pistons of other cylinders are compressing and thereby heating air in another cylinder.

The housing 33 for the gears or pinions 26 support the pinions 26 by means of roller bearings 34. This construction supports the pinions 26 freely rotatable and assists in supporting the crank shaft which is also supported by bearings 35 between the various connecting rods 31 and 32.

If it is desired, a clutch unit E of any desired type may be interposed between the gear 21 and the shaft 36 to be rotated by the power units D. This clutch unit E may permit the shaft 36 to be engaged or disengaged readily, it being understood however, that the gears 25 and 26 remain constantly in contact with the gear 21. A housing 37 is provided extending about the gears in order to protect the same and to permit proper lubrication. If the clutch unit E is employed, it is possible to disengage any single motor D or B from operation and to reverse the direction of rotation of the same or to entirely remove the motor for repairs or replacement.

In accordance with the patent statutes I have described the principles of construction and operation of my multiengined power device, and while I have endeavored to set forth the best embodiment thereof, I desire to have it understood that this is only illustrative of a means of carrying out my invention and that obvious changes may be made within the scope of the following claims without departing from the spirit of my invention.

I claim:

1. A power drive comprising a series of engines each including a plurality of crank shafts, cylinder means, and pistons in said cylinders for rotating said crank shafts, gear means connecting the crank shafts of all of said engines for rotation in synchronization, and a single gear means driven by said connecting gear means of all of said engines.

2. A power drive comprising a gear, a series of internal combustion engines circumferentially spaced about said gear, said engines each including a multiplicity of cylinders on each side of a common center, pistons therein, crank shaft means for said pistons on both sides of said center, means connecting said pistons and said crank shaft means, and pinion means on said crank shaft means on said common center intermediate the ends of said crank shaft means.

3. A power drive comprising a series of engines, each including a multiplicity of cylinders arranged in parallel relationship, a plurality of parallel crankshafts, pistons in said cylinders connected to said crankshafts, and aligned pinions on each of said crankshafts; a driven gear engageable with all of said pinions on all of said engines, each engine arranged with a plane through the axes of said parallel cylinders extending substantially tangent to said driven gear, and means supporting said engines in angular spaced relationship about the periphery of said driven gear.

4. A power drive comprising a series of engine units each engine unit including a plurality of parallel cylinders arranged in a pair of parallel rows, crankshafts for each plurality of cylinders, and pistons in said cylinders connected to said crankshafts, a pinion on each crankshaft, and a common gear engaging each of the pinions of the crankshafts of said engine units, a driven gear, a pinion for each engine unit engaging said driven gear, and clutch means interposed between each of said last named pinions and the corresponding common gear of each engine unit.

5. A power drive comprising a driven gear, a series of angularly spaced pinions engaging said driven gear, a clutch connected to each of said pinions to selectively engage with and disengage from said pinions, and an engine connected to each said clutch to drive said clutch and to selectively drive the pinion associated therewith.

6. A power drive comprising a plurality of engines, a pinion connected to each said engine, a clutch interposed between each said engine and its respective pinion, a driven gear in constant engagement with each of said pinions, rotation of said driven gear rotating all of said pinions, said clutches permitting independent operation of any or all of said engines.

GARFIELD A. WOOD.